United States Patent [19]
Kotzin et al.

[11] Patent Number: 6,108,322
[45] Date of Patent: Aug. 22, 2000

[54] METHOD OF ENABLING HANDOFF

[75] Inventors: Mike Kotzin, Buffalo Grove; Jeffrey D. Bonta, Arlington Heights, both of Ill.

[73] Assignee: Motorola, Inc., Schaumburg, Ill.

[21] Appl. No.: 08/672,833

[22] Filed: Jun. 28, 1996

[51] Int. Cl.[7] .................................................. H04Q 7/34
[52] U.S. Cl. ................................. 370/333; 370/337
[58] Field of Search ................................ 370/328, 329, 370/331, 332, 333, 336, 337, 345, 347; 455/422, 436, 437, 438, 439, 442, 443, 444, 507, 517

[56] References Cited

U.S. PATENT DOCUMENTS

| | | | |
|---|---|---|---|
| 4,868,891 | 9/1989 | Ide et al. ............................... | 455/166.2 |
| 5,042,082 | 8/1991 | Dahlin .................................... | 455/437 |
| 5,146,609 | 9/1992 | Tayloe et al. ........................... | 455/436 |
| 5,150,362 | 9/1992 | Akerberg ................................ | 370/331 |
| 5,157,661 | 10/1992 | Kanai et al. ............................ | 370/331 |
| 5,175,867 | 12/1992 | Wejke et al. ............................ | 455/439 |
| 5,179,559 | 1/1993 | Crisler et al. ........................... | 370/332 |
| 5,200,957 | 4/1993 | Dahlin .................................... | 165/134.1 |
| 5,228,029 | 7/1993 | Kotzin .................................... | 370/331 |
| 5,276,685 | 1/1994 | Kepler et al. ........................... | 370/332 |
| 5,301,356 | 4/1994 | Bodin et al. ............................ | 455/436 |
| 5,327,575 | 7/1994 | Menich et al. .......................... | 455/437 |
| 5,345,448 | 9/1994 | Keskitalo ................................ | 370/331 |
| 5,379,447 | 1/1995 | Bonta et al. ............................ | 455/437 |
| 5,381,443 | 1/1995 | Borth et al. ............................ | 375/202 |
| 5,383,221 | 1/1995 | Akita et al. ............................ | 375/219 |
| 5,392,453 | 2/1995 | Gudmundson et al. ................ | 955/444 |
| 5,428,816 | 6/1995 | Barnett et al. .......................... | 455/437 |
| 5,440,561 | 8/1995 | Werronen ............................... | 370/337 |
| 5,444,696 | 8/1995 | Petranovich ............................ | 370/337 |
| 5,471,671 | 11/1995 | Wang et al. ............................ | 455/226.2 |
| 5,491,837 | 2/1996 | Haartsen ................................. | 455/62 |
| 5,493,563 | 2/1996 | Rozanski et al. ....................... | 370/332 |
| 5,509,051 | 4/1996 | Barnett et al. .......................... | 455/443 |
| 5,524,009 | 6/1996 | Tuutijarvi et al. ...................... | 370/332 |
| 5,546,464 | 8/1996 | Raith et al. ............................. | 380/48 |
| 5,710,974 | 1/1998 | Granlund et al. ...................... | 455/62 |

FOREIGN PATENT DOCUMENTS

| | | |
|---|---|---|
| 160247 | 11/1985 | European Pat. Off. . |
| 530165A2 | 8/1992 | European Pat. Off. . |
| 2246490A | 1/1992 | United Kingdom . |
| WO 96/19088 | 6/1996 | WIPO .............................. H04Q 7/38 |

OTHER PUBLICATIONS

McLaughlin, Michael; Linder, Donald; and Carney, Scott; "Design and Test of a Spectrally Efficient Land Mobile Communications System Using LPC Speech", IEEE Journal on Selected Areas in Communications, vol. SAC–2, No. 4, Jul. 1984, pp. 611–20.

Mouly M et al., "The GSM System For Mobile Communications" GSM System for Mobile Communications, Comprehensive Overview of the European Digital Cellular Systems, Jul. 19, 1995, pp. 616–628.

*Primary Examiner*—Chi H. Pham
*Assistant Examiner*—Kwang B. Yao
*Attorney, Agent, or Firm*—John J. King; Daniel Collopy

[57] ABSTRACT

A method improves the decoding rate and reliability of adjacent cell base stations by expediting the decode process if the signal quality of a traffic channel is within a predetermined range. In particular, adjacent control channels are monitored and decoded at a rapid rate by ignoring the speech traffic channel information. The speech is interrupted (526) and the channel information is decoded (526) when, for example, the bit error rate or frame error rate of the traffic channel (TCH) is deteriorating while another channel has a better signal. The scheduling of speech channel interruptions (522) may also occur when insufficient neighbor cell information is available at the beginning of a call or immediately after handover. The lost speech signal could be recovered (536) using conventional speech extrapolation techniques.

21 Claims, 7 Drawing Sheets

CONTROL CHANNEL TDMA FRAME MAPPING

FIG.3B

TRAFFIC CHANNEL TDMA FRAME MAPPING (1/2 OF A SACCH MULTIFRAME)

METHOD OF ENABLING HANDOFF

FIELD OF THE INVENTION

The present invention is generally related to communication devices, and more particularly to a method of enabling handoff in a wireless communication system.

BACKGROUND OF THE INVENTION

Communication systems which transmit information in frames, such as time division multiplexing (TDM), time division multiple access (TDMA), or code division multiple access (CDMA) communication systems, such as digital cellular systems, may employ subscriber assisted handoff which requires the mobile subscriber unit to measure signal strengths of adjacent neighbor cells. In addition to measuring signal strength, some systems, such as the Global System for Mobile Communications (GSM) as set forth in the ETSI-GSM Technical Specification available from the European Telecommunications Standards Institute, require the positive identification of an adjacent cell which is being measured by decoding an intermittently transmitted base station identification (ID) code (BSIC). These systems typically provide for a particular time for the subscriber to measure and decode the adjacent cell identities.

While the GSM system protocol insures that it is possible to make these measurements, the process of positively identifying all adjacent cell BSICs in such systems with subscriber assisted handoff can take considerable time. This time can also be particularly long in a system which employs synchronization between the cell sites to reduce the audio interruption time when a handover occurs. Synchronization creates a worse case measurement latency for adjacent cell BSICs. Similarly, in a microcellular system, this latency in decoding becomes a significant problem since movement through a cell can occur very rapidly, thereby requiring faster acquisition of the measurement information.

At the beginning of a call or when the visibility of neighbor cells changes drastically, (e.g. when a mobile turns the corner in a microcell system), multiple neighbors may need to be verified at once. As the serving cell signal drops rapidly, the measured signal of new cells may ramp up quickly. In a conventional 7 cell reuse pattern, measurement of the adjacent cell BSICs for a full set of six potential handover candidates increases to six times the amount of time to measure a single candidate. This problem is further enhanced by the fact that there may be a large number of other neighbor cells in the neighbor list that need to be decoded periodically.

Accurate decode information makes it possible to make rapid, accurate handover decisions. If the mobile is unable to quickly decode the identity of new cells, then the possibility exists for an extended period of poor call quality and possibly even a dropped call. For example, when a mobile turns a corner in a microcell system, a survey cell signal may drop quickly while a new cell may ramp up quickly. Similarly, a mobile may have decoded a specific cell identity prior to turning the corner. Once a mobile turns the corner, a co-channel reuser of the previously decoded cell may suddenly become very strong. Without a frequent re-decode, it is possible that the previously decoded cell will be chosen for a handoff even though it was only valid before the mobile turned the corner.

Accordingly, there is a need for a method and apparatus for minimizing the handoff time in a communication system which generates frames to transmit information.

DETAILED DESCRIPTION OF THE INVENTION

The method and apparatus of the present invention improves the decoding rate and decoding reliability of adjacent cell base stations by expediting the decode process if the signal quality of a traffic channel is within a predetermined range, such as above or below a predetermined threshold. Adjacent control channels are monitored and decoded at a rapid rate by ignoring the traffic channel information. The information on the traffic channel could be speech traffic could be data, such as data in a multiframe data communication system. While the remaining description refers generally to speech, the description applies equally to data. The speech is interrupted and the channel information is decoded when, for example, the bit error rate or frame error rate of the traffic channel (TCH) is deteriorating while another channel has a better signal. The mobile unit may also interrupt speech and immediately decode the signals when the serving cell is undergoing a rapid decline in signal while a neighbor cell signal may be showing rapid improvement. When degraded conditions are detected, the expedited process is begun to improve the likelihood of providing the information necessary to handover to a viable target candidate. The scheduling of speech channel interruptions may also occur when insufficient neighbor cell information is available at the beginning of a call or immediately after handover. According to a further aspect of the present invention, the mobile unit could determine when a speech signal is strong to interrupt the traffic and obtain ID information or make additional measurements. The lost speech signal could be recovered using conventional speech extrapolation techniques.

Figure 1:
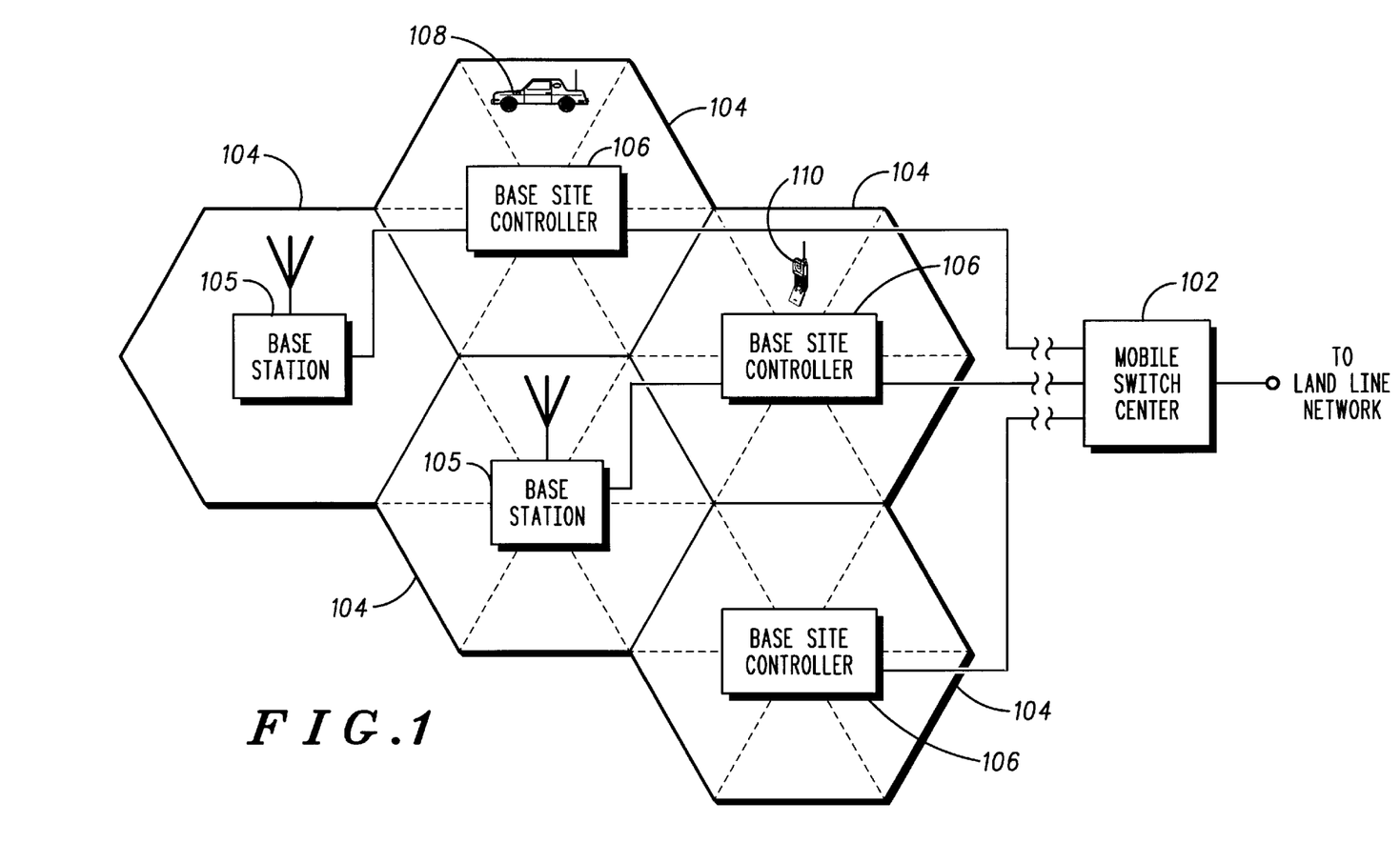
FIG. 1 is a plan view of a wireless communication network incorporating the present invention.

Turning now to FIG. 1, a wireless communication network 100 is shown. Wireless communication network 100 preferably includes a mobile switching center 102, a plurality of cell sites 104 each having a base station 105 coupled to a base site controllers 106. Finally, mobile communication devices 108 or portable communications devices 110 (collectively "mobile units") are adapted to communicate with base stations associated with base site controllers 106 to maintain communications with another mobile unit or a wireline unit associated with a landline network.

Figure 2:
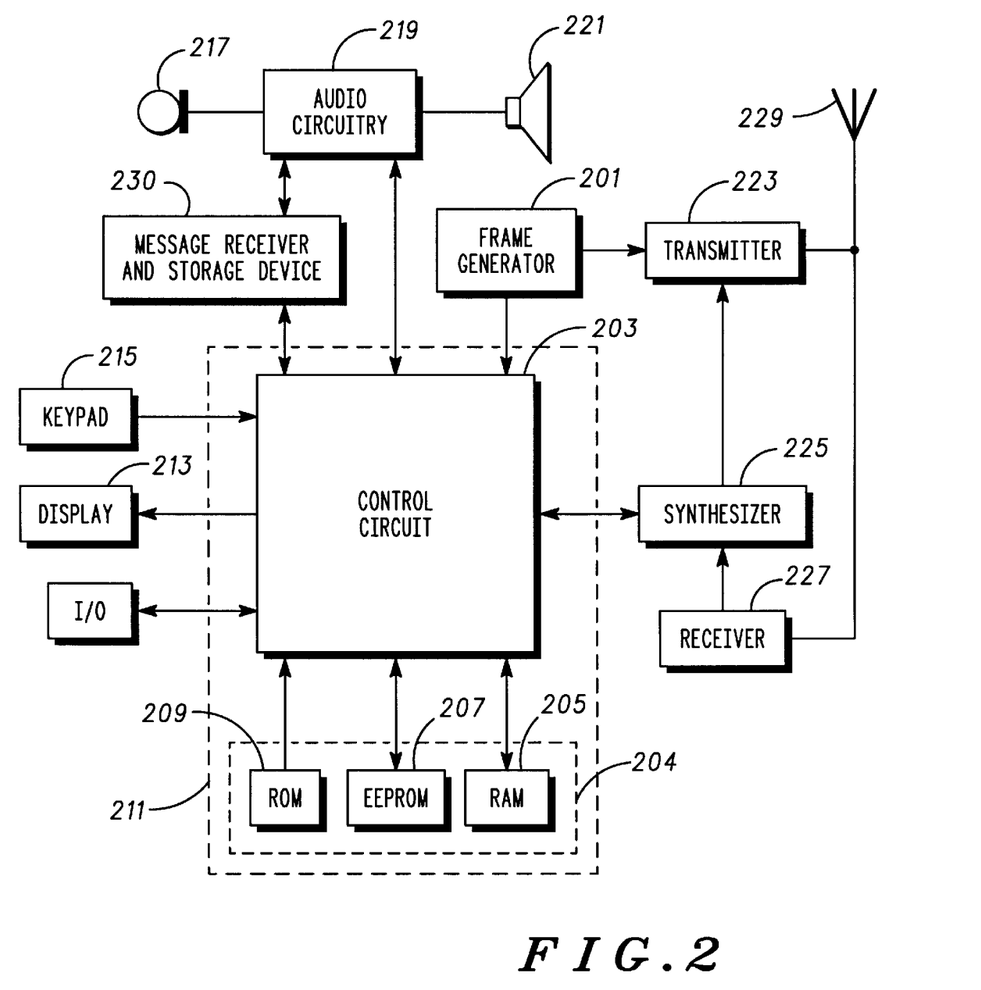
FIG. 2 is a block diagram of a subscriber unit of FIG. 1 incorporating the present invention.
Figure 3A:
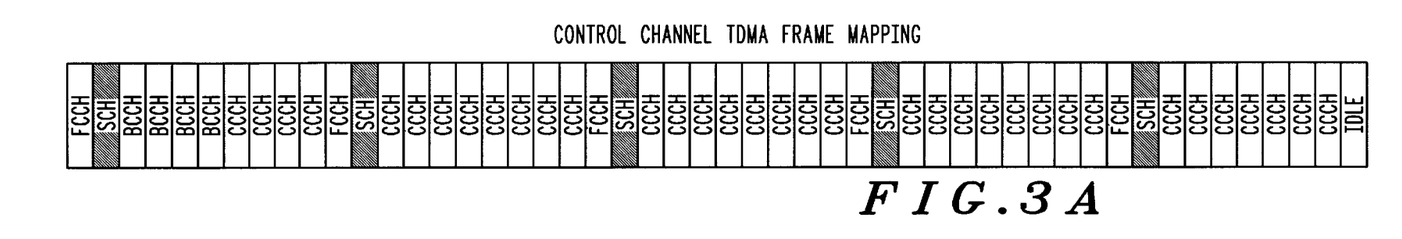
FIG. 3A is a frame diagram showing a control channel TDMA mapping.
Figure 3B:
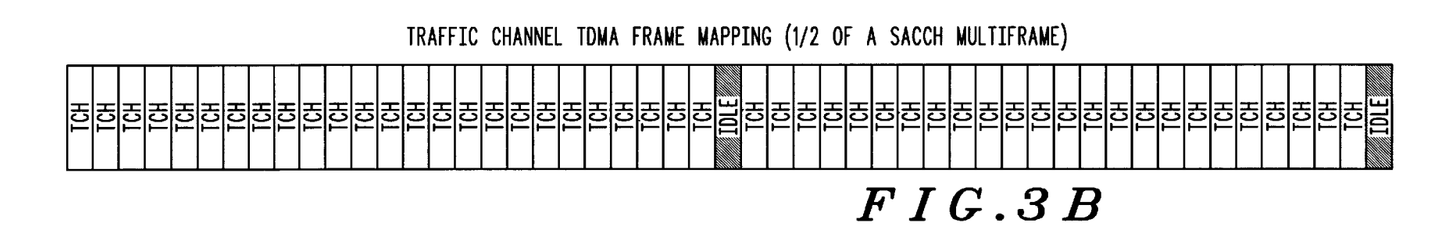
FIG. 3B is a frame diagram showing a traffic channel TDMA mapping.
Figure 3C:
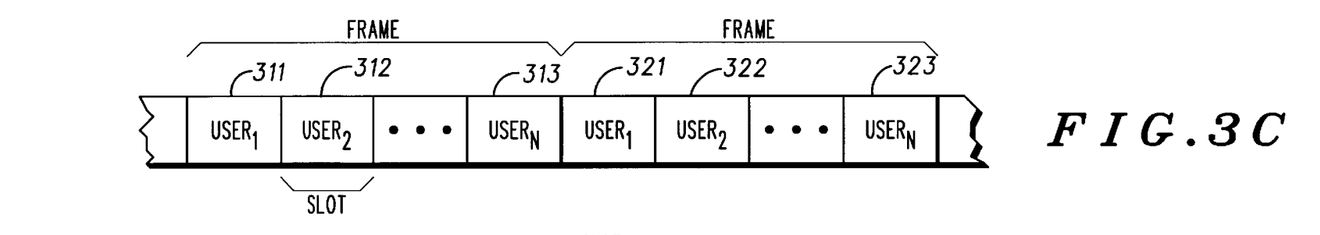
FIG. 3C is a frame diagram showing of a traffic channel in FIG. 3B.
Figure 3D:
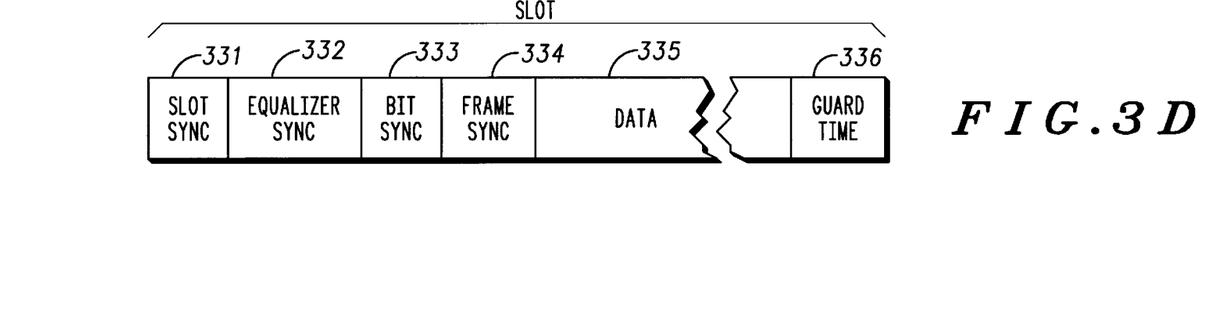
FIG. 3D is a frame diagram showing a slot in a frame of a traffic channel in FIG. 3C.

Turning now to FIG. 2, a block diagram shows a mobile unit such as a cellular radiotelephone or other wireless communication device for performing the method according to the present invention. In the preferred embodiment, an ASIC (Application Specific Integrated Circuit) 201, such as a CMOS ASIC available from Motorola, Inc. and control circuit 203, which could comprise a microprocessor, such as a 68HC11 microprocessor, also available from Motorola, Inc., combine to generate the necessary communication protocol for operating in the communication system. The control circuit 203 uses RAM 205, EEPROM 207, and ROM 209, consolidated in one package 211 in the preferred embodiment, to execute the steps necessary to generate the protocol and to perform other functions, such as writing to a display 213, accepting information from a keypad 215, and controlling a frequency synthesizer 225. The ASIC 201 processes audio transformed by the audio circuitry 219 from a microphone 217 and to a speaker 221. Transmitter 223 transmits through an antenna 229 using carrier frequencies produced by the frequency synthesizer 225. Information received by the mobile unit's antenna 229 enters the receiver 227 which demodulates the symbols comprising the message frame using the carrier frequencies from the frequency synthesizer 225. The mobile unit may optionally include a message receiver and storage device including digital signal processing means. The message receiver and storage device could be, for example, a digital answering machine or a paging receiver. While the circuitry of FIG. 2 shows an exemplary mobile unit, other circuitry could be employed within the scope of the present invention.

Turning now to FIG. 3, exemplary control channel and traffic channel frames are shown. The control channels shown in FIG. 3A are subdivided into broadcast control channel (BCCH) frames, common control channels (CCCH) frames, and blank channels (SCH) frames. The traffic channels shown in FIG. 3B comprises traffic channels (TCH) frames and idle frames. Two representative TCH frames having N slots for servicing N users are shown in FIG. 3C. In the GSM system, for example, eight slots are used for providing service to eight users. A representative slot for USER 2 is shown in FIG. 3D. Each slot preferably includes a sync slot 331, an equalizer sync 332, a bit sync 333, a frame sync 334, a data slot 335 and a guard band 336.

In the GSM system, for example, there are 104 logical TDMA frames making up a TCH in a SACCH multiframe comprising 26 frame multiframes. The control channel has two times fifty-one frames multiframes (or 102 total frames) for every SACCH multiframe. Because the control channel has 102 frames as compared with the 104 frames of the traffic channel, the control channel logical frames repeat faster and "slip" in time with respect to the TCH logical channels of the traffic channel. The first two TDMA frames on the control channel start up before the SACCH multiframe completes. In the 102 control channels frames, the SCH frame (containing the BSIC) occurs every ten frames. An idle frame at the end makes the fifty-first frame. When the TCH idle frame aligns with one of the SCH frames, the cell identity can be decoded. At the time a decision is made to decode the cell identity, it could take up to 11–26 multiframes or 11×120 milliseconds (i.e. 1.32 seconds) for the frames to align in conventional cellular systems such as a GSM cellular system.

At the beginning of a call or when the strength of signals from the servicing cell changes drastically, the signal strength of multiple neighboring cells may need to be verified at once. Measurement of the adjacent cell BSICs for each of the six neighboring cells which are potential handoff candidates in a conventional seven cell reuse pattern increases to about eight seconds assuming no misdecodes occur. The time to measure potential handoff candidates is further increased when a large number of neighbor cells in the neighbor list need to be decoded periodically, such as in a microcell environment. Accordingly, cells other than the strongest cells should also be periodically decoded in the event that they become one of the stronger measured cells.

Figure 4:
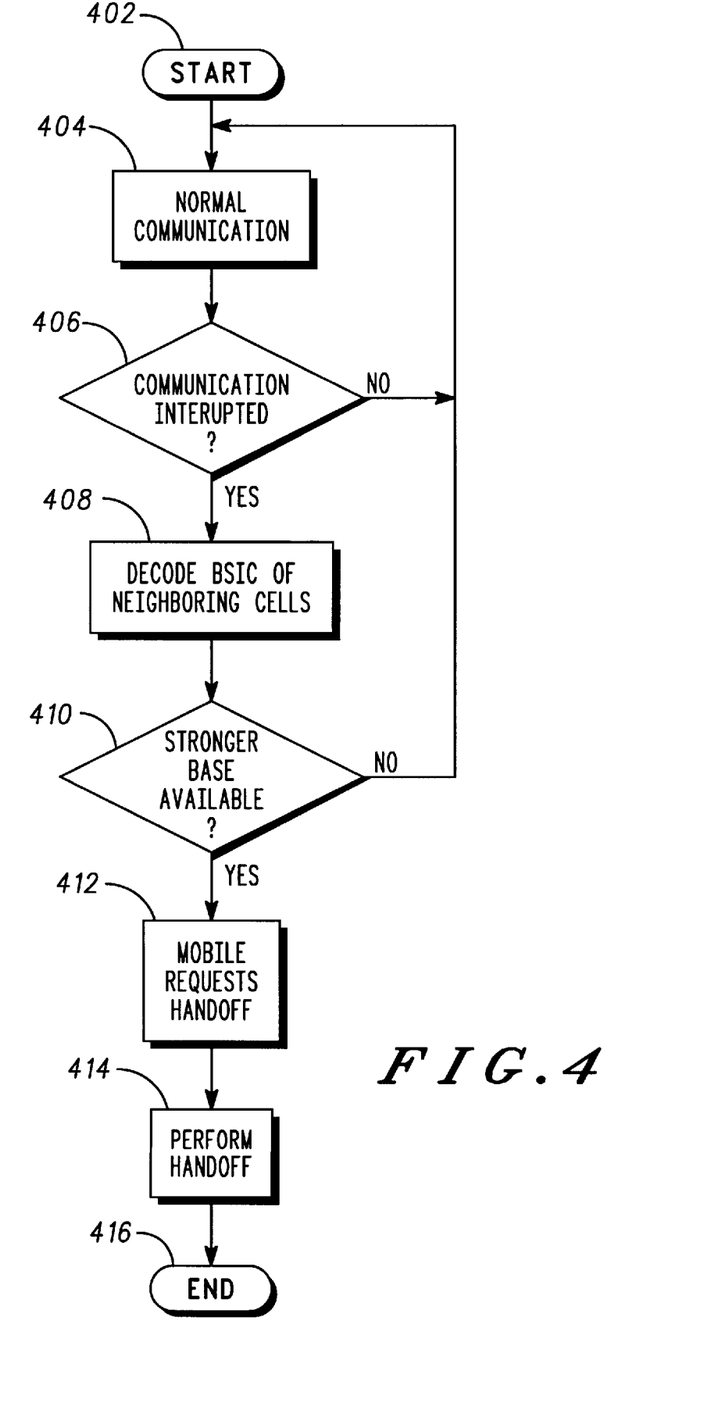
FIG. 4 is a flow chart showing the handoff operation performed by the subscriber unit of FIG. 2.

Turning now to FIG. 4, a flow chart shows a method for handing off according to the present invention. During a step 404 where normal communication is taking place between a mobile unit and a wireless communication network, the mobile unit determines whether communication is interrupted at a step 406. Communication could be interrupted for example when the bit error rate or frame error rate calculated by control circuit 203 exceeds a certain value. If the communication is interrupted, the mobile unit interrupts the speech to decode the BSIC of neighboring cells at a step 408. The mobile or serving base (in conjunction with the cellular network) then determines whether a stronger base is available at a step 410. As will be described in more detail in reference to the remaining figures, the mobile unit could determine that a stronger base station is available by maintaining a list of signal strength of new base stations. Alternatively, the base station could send a signal to the mobile unit informing the mobile unit of the stronger base station. If a stronger base is available, the mobile then sends a message to the network requesting a handoff at a step 412. A handoff, which is well known in the art, is then performed at a step 414.

Figure 5:
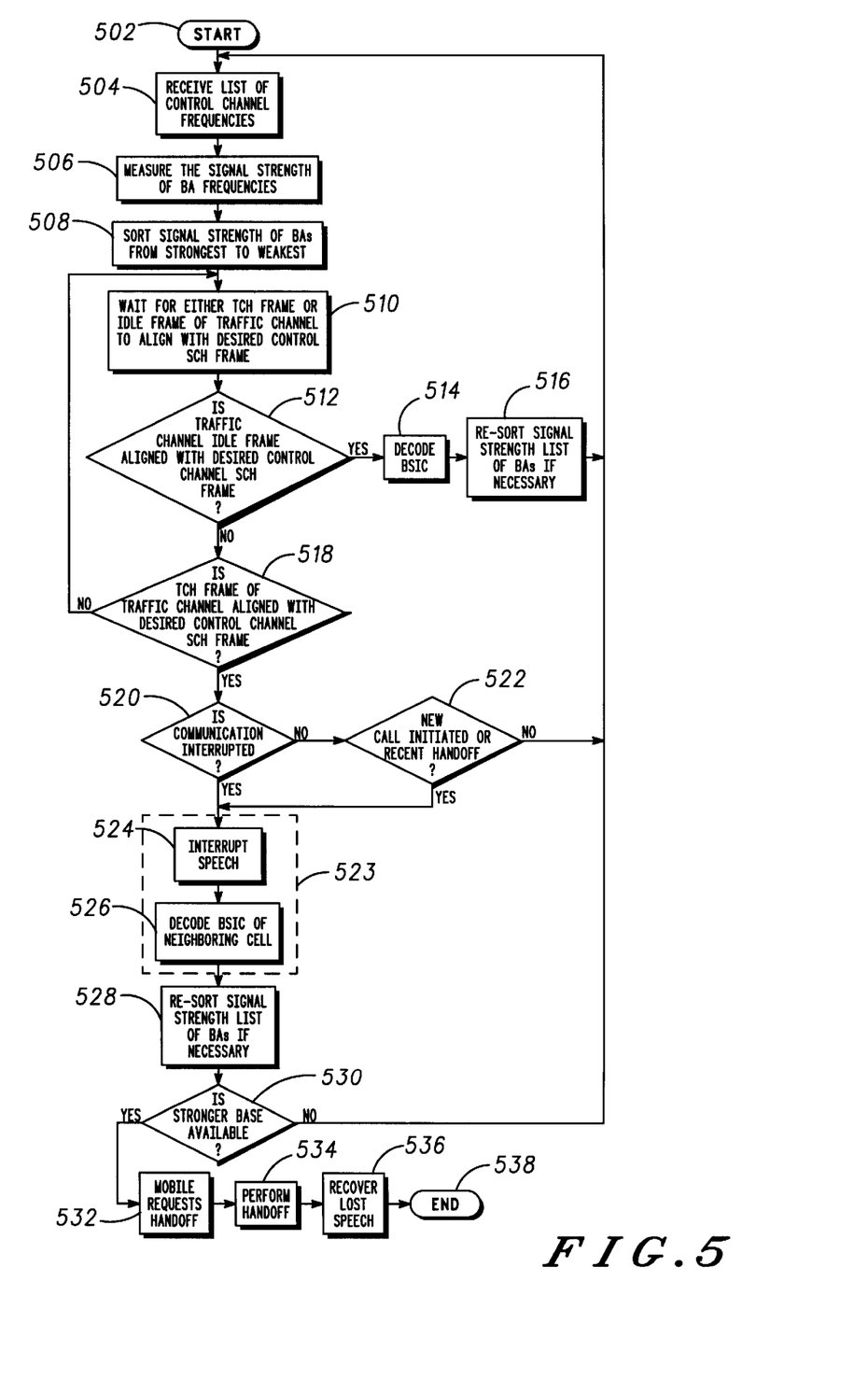
FIG. 5 is a flow chart showing in more detail the method for handing off performed by a subscriber unit according to the present invention.

Turning now to FIG. 5, a flow chart shows in more detail a method for requesting a hand off performed by a mobile unit according to the present invention. At the initiation of normal communication on the assigned traffic channel at a step 502, control circuit 203 of the mobile receives a list of control channel frequencies, commonly called the BCCH Allocation (BA), from the network by way of receiver 227 at a step 504, to monitor as potential handoff candidates. While in normal communication the control circuit measures or determines the signal strength of BA frequencies at a step 506, and sorts the signal strengths of the BAs from strongest to weakest at a step 508. The mobile then waits for either the TCH frame or the idle frame of the traffic channel to align with the desired control channel SCH frame at a step 510. If the mobile unit is operating in the system and had already scanned the base station, the mobile unit can predict when the TCH or idle frame of the traffic channel will align with the control channel SCH frame.

The control circuit of the mobile then determines whether the traffic channel idle frame is aligned with the SCH frame (having the cell identity) of the control channel at a step 512. If the idle frame of the traffic channel is aligned with the SCH frame of the control channel, the control circuit of the mobile decodes the BSIC at a step 514, and re-sorts the signal strength list of BAs at a step 516 if necessary based upon the BSIC decode. However, if the frames are not aligned and a decode of a strong BA frequency is required, the mobile then determines whether the TCH frame of the traffic channel is aligned with the desired control channel SCH frame at a step 518. If the TCH frame and the desired control channel SCH frame are not aligned, the mobile waits for the next frame alignment of either a traffic channel TCH frame or traffic channel idle frame with the desired control channel SCH frame, whichever comes first, at a step 510. Since traffic channel TCH frames repeat 24–25 times more frequently than idle frames, many new opportunities become available for frame alignment with the control channel SCH frame.

If a traffic channel TCH frame is aligned with the desired control channel SCH frame at a step 518, the control circuit of the mobile determines whether communication is interrupted at a step 520 by monitoring the bit error rate or frame error rate of the signal received by receiver 227. If communication is not interrupted, the control circuit determines whether the current traffic channel assignment was just recently established as a result of a new call being made or received or recent handoff at a step 522. If communication is interrupted at a step 520, or a new call is initiated or a recent handoff has occurred at a step 522, the mobile interrupts speech at a step 524. In particular, the control circuit ignores data which would be received in data slot 335 of the mobile's assigned slot and tunes the receiver to monitor a control channel. The control circuit then attempts to decode the BSIC transmitted on the control channel at a step 526. The mobile will report measurements of any control channel frequency found in the BA to the network, provided that the cell identity of that neighbor was recently decodable by the mobile. The mobile will preferably decode the BSIC of the cell having the greatest signal strength (or some other criteria) to increase the likelihood that the cell of the decoded BSIC will have the strongest signal and will be selected for a handoff. The control circuit will resort the list of BAs according to signal strength if necessary at a step 528. The mobile or serving base station determines which measured and decoded neighbor cell is the strongest and in conjunction with the cellular network, determines if this identified strongest neighbor is available at a step 530. If a stronger base is not available, the mobile continues normal communication on the same channel. However, if a stronger base is available, the mobile makes a request at a step 532 to enable a handoff at a step 534. The mobile then preferably recovers lost speech at a step 536. Digital speech interpolation performed at step 536 to recover lost speech is well known in the art, as described for example in "Design and Test of a Spectrally Efficient Land Mobile Communications Systems using LPC Speech" by Michael McLaughlin, Donald Linder and Scott Carney published in the I.E.E.E. Journal On Selected Areas In Communications, Vol. SAC-2, No. 4, July 1984, or U.S. Pat. No. 4,868,981 entitled "Interrupted Audio Fill-In System For Noise Reduction And Intelligibility Enhancement In Multi-Channel Scanning Receiver Applications" to John D. Ide, John P. Fussell, Aaron S. Rogers, the entire application of which is incorporated by reference.

Figure 6:
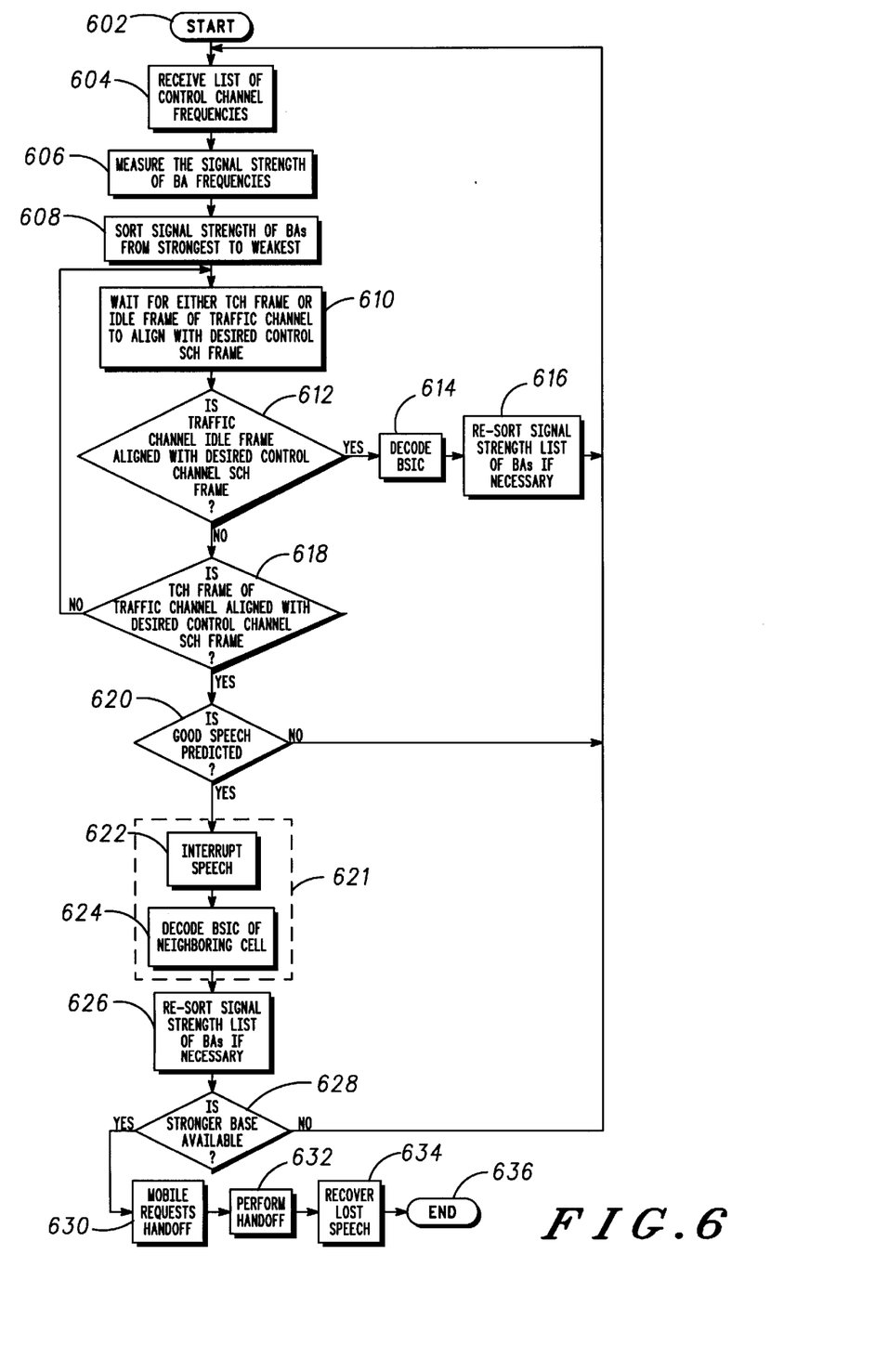
FIG. 6 is a flow chart showing an alternate method for handing off according to the present invention.

Turning now to FIG. 6, a flow chart shows the method for performing a handoff according to an alternate embodiment of the present invention. At the initiation of normal communication on the assigned traffic channel at a step 602, the mobile receives a list of control channel frequencies at a step 604, to monitor as potential handoff candidates. While in normal communication the control circuit determines the signal strength of BA frequencies at a step 606, and sorts the signal strengths of the BAs from strongest to weakest at a step 608. The mobile then waits for either the TCH frame or the idle frame of the traffic channel to align with the desired control channel SCH frame at a step 610.

The control circuit then determines whether the traffic channel idle frame is aligned with the SCH frame of the control channel at a step 612. If the idle frame of the traffic channel is aligned with the SCH frame of the control channel, the mobile decodes the BSIC at a step 614. The mobile re-sorts the signal strength list of BAs at a step 616 if necessary based upon the BSIC decode. However, if the frames are not aligned and a decode of a strong BA frequency is required, the mobile then determines whether the TCH frame of the traffic channel is aligned with the desired control channel SCH frame at a step 618. If the TCH frame and the SCH frame are not aligned, the mobile waits for the next frame alignment of either a traffic channel TCH frame or traffic channel idle frame with the desired control channel SCH frame, whichever comes first, at a step 610.

If a traffic channel TCH frame is aligned with the desired control channel SCH frame at a step 618, the mobile determines whether good speech is predicted at a step 620. Good speech can be predicted by monitoring the bit error rate, frame error rate, or some other criteria for determining signal quality. If good speech is predicted, the control circuit interrupts speech at a step 622. The control circuit then attempts to decode the identity of the cell contained in the control channel at a step 624. The mobile will report measurements of any control channel frequency found in the BA to the network, provided that the cell identity of that neighbor was recently decodable by the mobile. The control circuit will re-sort the list of BAs based upon signal strength if necessary at a step 626. The mobile or serving base determines which measured and decoded neighbor cell is the strongest and in conjunction with the cellular network, determines if this identified strongest neighbor is available at a step 630. If a stronger base is available, the mobile requests a handoff at a step 632 and the network performs a handoff at a step 634. Because the speech is good, the mobile recovers lost speech according to techniques well known in the art at a step 620. While the embodiments of FIGS. 5 and 6 are shown in separate flow charts, the two embodiments could be employed concurrently according to the present invention.

Figure 7:
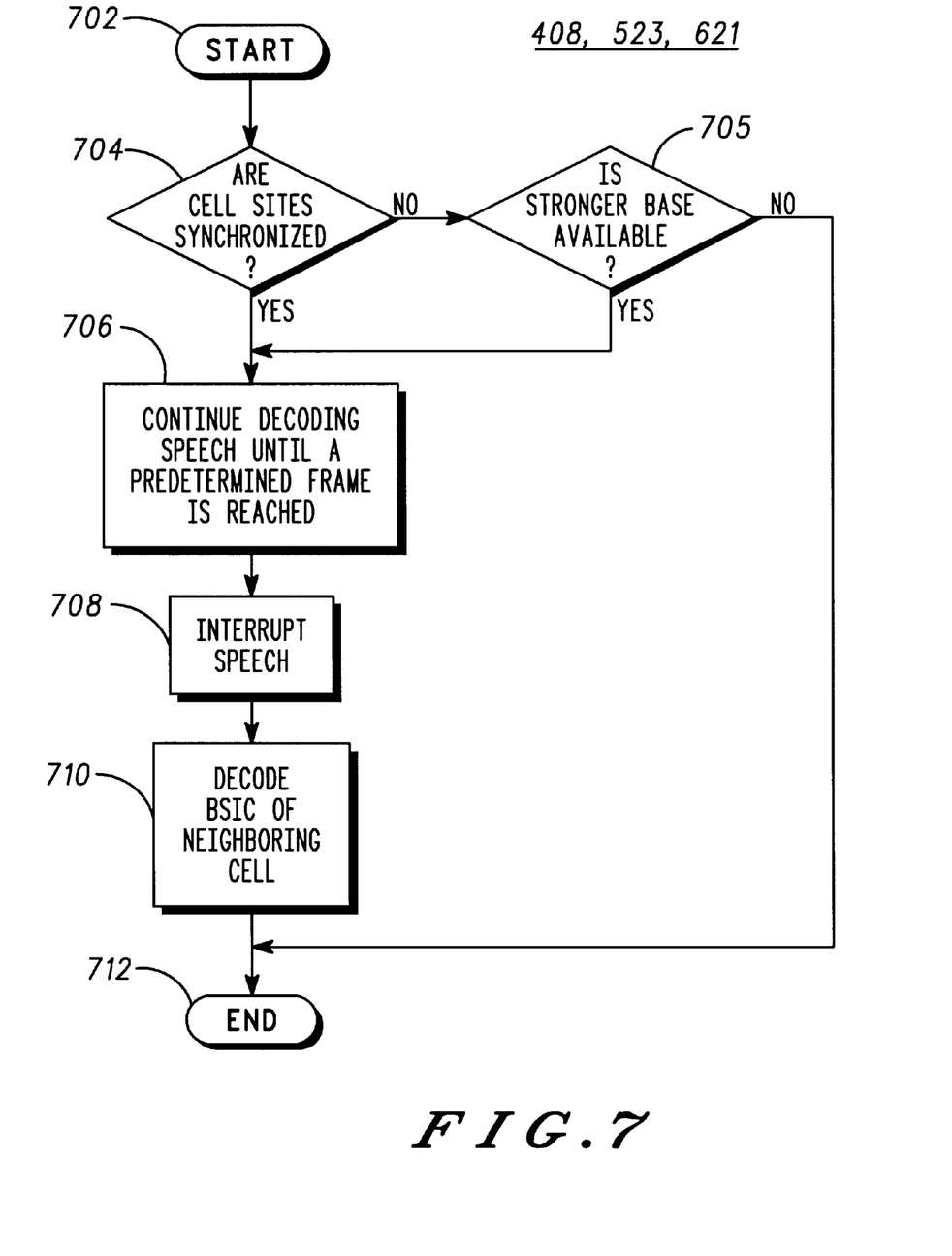
FIG. 7 is flow chart showing steps of checking the signal strength of neighboring cells of steps 408, 523 and 621 of FIGS. 4, 5 and 6 respectively according to the present invention.

Turning now to FIG. 7, a method for checking the signal strength of neighboring cells according to the present invention is shown. The mobile unit first determines whether the cell sites are synchronized at a step 704. If the cells are synchronized, the mobile unit can intelligently interrupt speech when it knows a SCH frame of the control channel can be decoded. If the cell sites are not synchronized, the control circuit of the mobile determines whether a prior frame alignment is known at a step 705. A prior frame alignment could be detected during an earlier scan of a base station and could also be used to delay the interruption of speech to decode adjacent cell identities. If the cell sites are synchronized or the prior frame alignment is known, the control circuit continues decoding until a predetermined frame having the cell identity is reached at a step 706. The control circuit then interrupts speech at a step 708 and monitors a control channel to send a BSIC when the frame having the cell identity is reached. By interrupting speech when a SCH frame will be detected, the mobile unit will minimize the loss of speech. Finally, the mobile unit decodes the BSIC of the neighboring cell when the idle frame is aligned with the SCH frame at step 710.

Although the invention has been described and illustrated in the above description and drawings, it is understood that this description is by way of example only and that numerous changes and modifications can be made by those skilled in the art without departing from the true spirit and scope of the invention. For example, although a GSM system has been described by way of example, the method and apparatus of the present invention could apply to any TDM or TDMA mobile and system, or other device or system decoding frames of information. Although the present invention finds particular application in portable cellular radiotelephones, the invention could be applied to any wireless communication device, including pagers, electronic organizers, or computers. Our invention should be limited only by the following claims.

We claim:

1. A method of monitoring channels by a mobile unit in a communication system transmitting frames of information, said method comprising the steps of:
monitoring the signal quality of a current traffic channel;
determining that the signal quality of the current traffic channel is within a predetermined range;
ignoring information received on a current traffic channel during a time slot assigned to said mobile unit for receiving information;
monitoring a control channel during the time slot assigned to said mobile unit for receiving information; and
maintaining a list of the signal strength of new base stations to determine whether a stronger base station is available.

2. The method of monitoring channels of claim 1 wherein said step of monitoring the signal quality comprises evaluating the bit error rate.

3. The method of monitoring channels of claim 1 wherein said step of determining that the signal quality of the current traffic channel is within a predetermined range comprises determining whether the signal quality is below a predetermined threshold.

4. The method of monitoring channels of claim 1 wherein said step of determining that the signal quality of the current traffic channel is within a predetermined range comprises determining whether the signal quality is above a predetermined threshold.

5. The method of monitoring channels of claim 1 wherein said step of ignoring information comprises ignoring speech traffic.

6. The method of monitoring channels of claim 1 further including a step of using error correction to recover information lost while monitoring a control channel.

7. The method of monitoring channels of claim 1 further comprising a step of determining whether a new call is initiated or a recent handoff was performed.

8. The method of monitoring channels of claim 1 wherein said step of monitoring a control channel comprises monitoring a control channel of a TDMA communication system having a plurality of base station which are synchronized.

9. The method of monitoring channels of claim 8 wherein said step of monitoring a control channel comprises decoding a base station ID code transmitted in SCH frames which periodically repeat after a predetermined number of frames.

10. The method of monitoring channels of claim 9 wherein said step of ignoring information comprises a step of waiting until a predetermined TCH frame of said current traffic channel is aligned with a SCH frame of said control channel to ignore speech traffic.

11. The method of monitoring channels of claim 9 further including a step of building a list of base stations from strongest to weakest according to signal strength.

12. The method of monitoring channels of claim 11 further including a step of requesting a hand off if another base station has a stronger signal.

13. A method of monitoring channels by a mobile unit in a GSM communication system, said method comprising the steps of:
monitoring the signal quality of a current traffic channel;
determining that the signal quality of the current traffic channel is within a predetermined range;
ignoring information received during a predetermined TCH frame when said predetermined TCH frame aligns with a predetermined SCH frame;
decoding a base station ID of said predetermined SCH frame; and
maintaining a list of the signal strength of new base stations to determine whether a stronger base station is available.

14. A method of initiating a hand off by a mobile terminal in a communication system having a plurality of base stations, said method comprising the steps of:
receiving a downlink on a current traffic channel assigned to a first base station of said plurality of base stations;
monitoring the signal quality of the current traffic channel;
monitoring a control channel during an assigned time slot if the signal quality of the current traffic channel is within a predetermined range;
maintaining a list of the signal strength of said plurality of base stations to determine whether a stronger base station is available; and
requesting a hand off if the signal quality of another base station of said plurality of base stations is greater than the signal quality of the current traffic channel.

15. The method of initiating a hand off of claim 14 wherein said step of monitoring the signal quality comprises evaluating the bit error rate.

16. The method of initiating a hand off of claim 14 wherein said step of monitoring a control channel comprises decoding a base station ID code transmitted in SCH frames which periodically repeat after a predetermined number of frames.

17. The method of initiating a hand off of claim 16 further including a step of ignoring information comprising a step of waiting until a predetermined TCH frame of said current traffic channel is aligned with a predetermined SCH frame of said control channel.

18. The method of initiating a hand off of claim 17 further including a step of building a list of base stations of said plurality of base stations from strongest to weakest according to signal strength.

19. The method of initiating a hand off of claim 14 further including a step of requesting a hand off if another base station of said plurality of base stations has a stronger signal.

20. The method of initiating a hand off of claim 14 further including a step of using error correction to recover information lost while monitoring another traffic channel.

21. A method of initiating a hand off by a mobile terminal in a GSM communication system, said method comprising the steps of:
receiving a downlink on a current traffic channel;
estimating the signal quality of the current traffic channel;
waiting until a predetermined TCH frame of said current traffic channel is aligned with a predetermined SCH frame of a control channel;
monitoring said control channel during an assigned time slot to receive information if the signal quality of the current traffic channel is within a predetermined range;
decoding a base station ID code transmitted in said predetermined SCH frame;
maintaining a list of the signal strength of new base stations to determine whether a stronger base station is available; and
requesting a hand off if the signal quality of another base station is greater than the signal quality of the current traffic channel.

* * * * *